United States Patent

Oshima

[11] 3,943,536
[45] Mar. 9, 1976

[54] SIMPLIFIED CAMERA
[75] Inventor: Shigeru Oshima, Tokyo, Japan
[73] Assignee: Fuji Photo Film Co., Ltd., Minami-ashigara, Japan
[22] Filed: July 15, 1974
[21] Appl. No.: 488,863

[30] Foreign Application Priority Data
July 23, 1973 Japan............................ 48-83462

[52] U.S. Cl. ................. 354/204; 354/212; 354/203
[51] Int. Cl.² ........................................ G03B 17/42
[58] Field of Search .......... 354/204, 206, 212, 213, 354/202, 203

[56] References Cited
UNITED STATES PATENTS

| 2,395,828 | 3/1946 | Kallusch | 354/204 |
| 3,603,235 | 9/1971 | Nelson | 354/213 |
| 3,735,681 | 5/1973 | Galbraith | 354/204 |

Primary Examiner—Robert P. Greiner
Attorney, Agent, or Firm—Sughrue, Rothwell, Mion & Zinn

[57] ABSTRACT

A simplified camera loading a film having perforations directly therein, wherein film advance and shutter actuation are effected by three basic elements, which are a shutter actuation plate, a film advance lever, and a release lever, thereby to render to minimize necessary elements and to reduce the cost thereof.

2 Claims, 2 Drawing Figures

SIMPLIFIED CAMERA

BACKGROUND OF THE INVENTION

The present invention relates to a simplified camera, and more particularly to a simplified camera wherein a film advance means is actuated to advance a film one frame simultaneously with movement of a shutter actuation means to a cocked position, and the shutter actuation means is retained in a cocked position for a required time by engagement of the film advance means with a film perforation.

DESCRIPTION OF THE PRIOR ART

There are known various types of simplified cameras, which have the main object of making it possible to obtain photographs in a simple manner, and with low-cost equipment. If classified according to the manner of loading film, these cameras may be divided into two broad types. With one type, film is provided in a pack or cassette which is loaded into a camera. With the other type film is loaded directly into a camera, by a film manufacture, or at an establishment for development of film.

The simplified camera of the present invention if of the latter type. With this type of camera, a photographer need only be concerned with the actual taking of photographs, and after exposure of a complete roll of film in a camera, the photographer simply takes the camera, still containing the film to an establishment for film development, where the exposed film is removed and a new film loaded, in other words, as well as being employed to take photographs, the camera is also, in a sense, a film pack, there being no other, separately provided means for protection or containment of a film. It is therefore desirable that the cost of this type of camera be comparable with that of a film itself, which only achievable by the provision of a camera having a construction as simple as possible. A further reason for it being desirable for this type of camera to be simple in construction and low in cost is that, because of the procedure involved in changing a film, and because a camera containing a fully exposed roll of film is not useable until the film is changed, it is of considerable convenience for a photographer above to acquire two, or more, such cameras, without undue financial burden, and thus not have to proceed to a special establishment for film development each time one complete roll has been exposed.

It is accordingly an object of the present invention to provide a simplified camera wherein necessary elements are kept to a minimum, and cost thereof is correspondingly lowered.

It is another object of the invention to provide a simplified camera wherein a photographer may known when a last film frame has been exposed, without it being necessary to employ a separately provided indication means.

SUMMARY OF THE INVENTION

In accomplishing these and other objects, there is provided, according to the present invention, a simplified camera, wherein film advance and shutter actuation are effected by three basic elements, which are a shutter actuation plate, a film advance lever, and a release lever. The shutter actuation plate is reciprocally slidable parallel to the line of film advance, and carries an arm, which causes the camera shutter to open when the actuation plate is moved from a cocked position to an uncocked position by a spring means attached thereto. The film advance lever also is mounted on the shutter actuation plate, and is carried thereby in a line parallel to the line of film advance, and is normally urged towards a loaded film, to engage a perforation therein, whereby the film is advanced one frame each time the shutter actuation plate is moved to a cocked position. Once moved to a cocked position, the shutter actuation plate is held in this position due to the continued engagement of the film advance lever mounted thereon with a film perforation. However, the film advance lever is slidable with respect to the shutter actuation plate in a direction normal to the direction of reciprocal motion thereof, i.e., towards or away from the film, and depression of the camera shutter button causes the release lever to push the film advance lever away from the film, and out of engagement with the film perforation, whereupon the shutter actuation plate is no longer retained and is moved back to an uncocked position by the abovementioned spring means, and during this return movement, actuates the camera shutter the film advance lever being subsequently allowed to be moved back towards the loaded film, and engage the perforation of the next frame thereof.

Also according to the invention, in the release lever there is formed a recessed portion immediately adjacent to the end thereof which may contact the film advance lever, and in the loaded film, an elongate perforation is provided after the last frame of the film. Thus, after the last frame has been exposed, when the shutter actuation plate is again moved to a cocked position, the film advance lever engages this elongate perforation, and pushing the forward edge thereof, advances the film a distance equal to the length of one frame. However, after the shutter actuation plate has been moved to a cocked position, the elongate perforation permits the shutter actuation plate, together with the film advance lever, to be moved back slightly by the spring means attached to the shutter actuation plate, until the film advance lever comes into contact with the rear edge of the elongate perforation. In this position, the film advance lever is in line with the recessed portion of the release lever, which now, even though the shutter button is actuated, cannot contact the film advance lever to release the shutter actuation lever, whereby a photographer may know that a last film frame has been exposed.

BRIEF DESCRIPTION OF THE DRAWINGS

In any event, these and other objects and features of the present invention will become apparent to those skilled in the art from the following description taken in conjunction with one preferred embodiment thereof with reference to the accompanying drawings, in which.

Before the description of the present invention proceeds, it is to be noted that like parts are designated by like reference numerals through out the accompanying drawings.

DESCRIPTION OF THE PREFERRED EMBODIMENT

Figure 1:
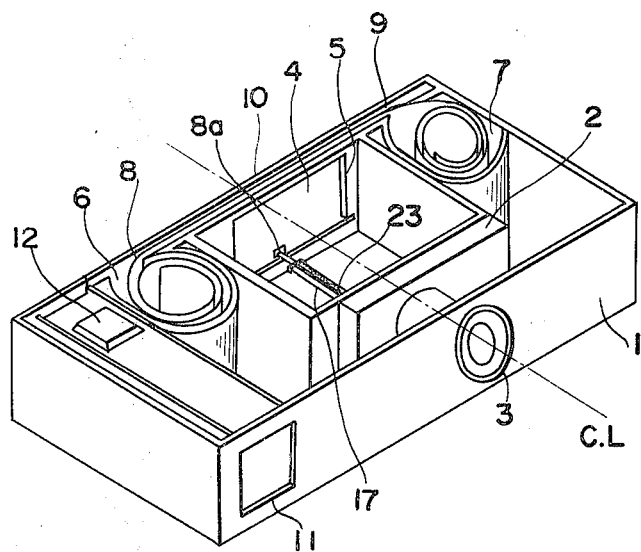
FIG. 1 is a perspective view showing main portions of a simplified camera having the top cover thereof removed in accordance with the present invention.

Referring to FIG. 1, there is shown a camera comprising a main housing 1, in a generally central portion of which there is provided a main internal mount 2. The top cover of the housing 1 is fixedly or integrally attached to cover the top plane of the main housing 1, but, for convenience is not shown in the drawing. In a generally central portion of the main mount 2 there is formed an exposure opening 4, which is equal in dimensions to a frame of a film 8 to be exposed, and is in line with the optical axis CL of a lens 3, which is supported in a front portion of the main internal mount 2 and of the housing 1. In the rear of the housing 1, and on opposite sides of the main internal mount 2, there are provided cylindrical chambers, which are, respectively, a loading chamber 6 for reception of unexposed film 8, and a wind-up chamber 7 for the reception of exposed film 8. The rear wall of the camera is constituted by a board 10, which may be fixable to the housing 1, but is slid sideways off the housing 1, in order to permit loading or unloading of film 8 into or from the camera. The rear board 10 does not contact the rear of a internal mount portion 5 of the main mount 2, whereby a passageway 9 is constituted between the board 10 and mount portion 5. A film 8 is initially loaded into the loading chamber 6, then guided through the passageway 9, and into the wind-up chamber 7, film advance being effected in a manner described below, and frames of the film 8 being brought successively into alignment with the exposure opening 4 defined by the mount portion 5, where they are each exposed in turn, upon depression of a shutter button 12, which is provided near one end of, and projects above the top cover of the housing 1, and causes actuation of a shutter 28 provided in line with the lens axis CL in a conventional known manner. At the same end as the shutter button 12, the housing 1 also supports a viewfinder 11.

Figure 2:
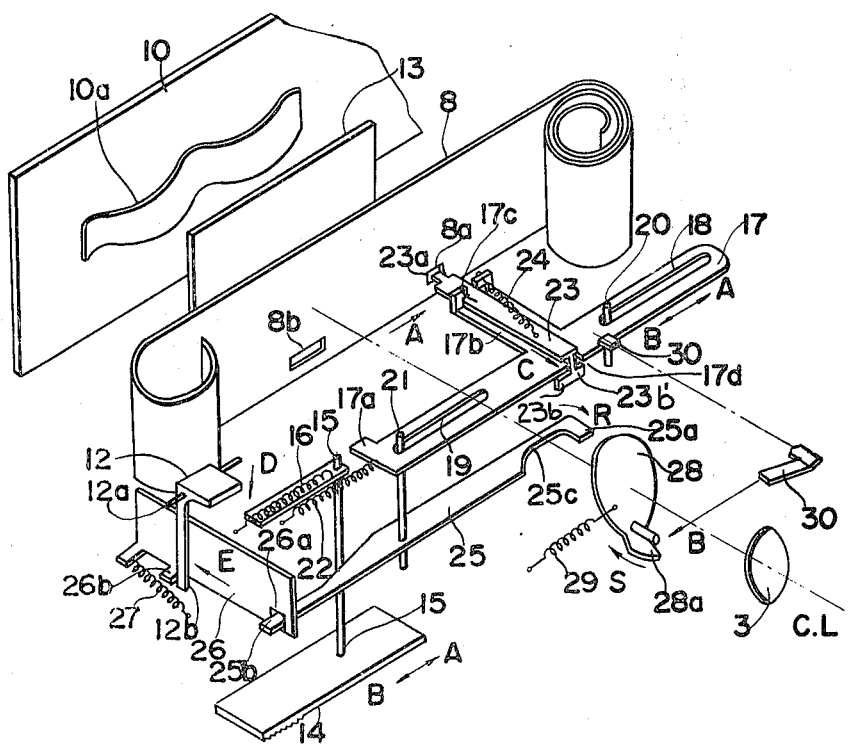
FIG. 2 is a perspective view of essential components to be assembled into the camera of FIG. 1, for the purpose of illustrating the relationship between said components.

Referring now to FIG. 2, on the forward side of the rear board 10 there is mounted a spring plate 10a, which, acting through a pressure plate 13, exerts forward pressure on successive frames of the film 8 brought into alignment with the exposure opening 4, whereby film frame to be exposed are held in correct alignment relative to both the lens axis CL and the exposure opening 4. Successive frames of the film 8 are brought into alignment with the exposure opening 4 by a film advance lever 23, which is mounted on a shutter actuation plate 17. The actuation plate 17, which, together with other associated element described below, is provided in the main mount 2, comprises a long main portion 17a, which is aligned parallel to the rear board 10, and in which, near opposite ends thereof, there are formed alinged elongated slots 18 and 19, respectively, and a lever support arm 17b, which is in integral attachment to the long main portion 17a, and extends at right-angles therefrom towards the rear board 10. Pins 20 and 21, which are fixedly attached to and project vertically upwards from the base of the main mount 2, extend through the slots 18 and 19 of the actuation plate 17, respectively, whereby the actuation plate 17 may be slid leftwards or rightwards, i.e., in the direction indicated by the arrow B or A in the drawing in a range with length of the slots 18 and 19. The line joining the pins 20 and 21 being parallel to the line of film advance, movement of the actuation plate 17 also, in the direction A or B, is parallel to the line of film advance. The left-hand end of the actuation plate 17 is in fixed attachment to a tension spring 22, whose other end is in fixed attachment to a left-hand wall of the main mount 2, and which exerts a constant force to move the actuation plate 17 in the direction B, and to a left-most, uncocked position. The actuation plate 17 may be moved in the direction A, counter to the force of the spring 22, by pressure of a rod 15 against a contact projection 17a formed at the left-hand end of the plate 17. The rod 15 is fixedly attached to and extends vertically upwards from a cocking plate 14, which is slidably mounted in and projected outwardly its bottom plane downwards from a groove of a panel, not shown, formed in the base wall of the housing 1, and is contactable by a photographer to operate with its bottom plate, as employed in a conventional construction known by those skilled in the art. The cocking plate 14 is slidable in directions A and B, and when the cocking plate 14 is pushed manually in the direction A by a photographer, the rod 15 attached thereto pushes the contact projection 17a of the actuation plate 17, and causes the actuation plate 17 also to be moved in the direction A, and into a cocked position thereof. When, subsequently, manual pressure is removed from the cocking plate 14, the actuation plate 17 is retained in a cocked position in a manner described below, but the cocking plate 14 is returned to its original position, independently of the actuation plate 17, by a tension spring 16, which is attached at one end to the rod 15, and at the other end to the left-hand wall of the main mount 2.

Still in FIG. 2, the rear end of the lever support arm 17b extending rearwards from the main portion 17a of the actuation lever 17, towards the mount portion 5 forms two separated, bracket-shaped portions, which are bent upwards, at right-angles to the support arm 17b, and constitute a guide gate 17c. The above-mentioned film advance lever 23 is supported on and lies along the length of the support arm 17b, and passes slidably through the guide gate 17c. At the forward end of the film advance lever 23 there is formed an integrally attached slide extension 23b', which extends downwards at right-angles from the main portion of lever 23, and lies in and is slidable in a recess 17d formed in the front edge of the actuation plate 17, in line with the support arm 17b. The slide extension 23b'extends to below the actuation plate 17, and the lower end thereof forms a contact tab 23b, which is contactable by a release lever 25, described below. The film advance lever 23 is constrained to move together with the actuation plate 17 in the directions A and B, but may slide relative to the plate 17, in a direction C, which is normal to the directions A and B, i.e., the film advance lever 23 may be moved towards or away from the rear board 10 and the film 8. The film advance lever 23 is normally urged towards the film 8 by a small tension spring 24, which is attached at one end to a generally central portion of the lever 23, and at the other end to the guide gate 17c. When the spring 24 is unopposed, the film advance lever 23 is moved rearwards thereby to a position wherein the rear end of the lever 23, which constitutes an engagement end 23a may engage a perforation 8a of the film 8, there being a perforation 8a for each frame of the film 8. The film advance lever 23 may, however, be moved forwards, counter to the force of the spring 24, and out of engagement with a film perforation 8a, by the action of the above-mentioned release lever 25.

The release lever 25 is provided in a left-to-right alignment below the level of the actuation lever 17, and is pivotally mounted on the fixed pin 21, which extends through the slot 19 of the actuation plate 17. The right-hand end of the release lever 25 constitutes a tab contact end 25a. When actuated, the release lever 25 is pivoted in the direction indicated by the arrow R in the drawing, and the contact end 25a thereof is moved forwards and brought into contact with the tab 23b of the film advance lever 23, and pushes the lever 23 forwards, away from the film 8. In the forward edge of the release lever 25, and adjacent to the contact 25a thereof, there is formed a recessed portion 25c, into which the tab 23b of the film advance lever 23 is insertable to make a small gap therebetween, thereby to permit film advance lever 23 engagement with elongate perforation 8b of the film 8, as described in further detail later. The other end 25b of the release lever 25 passes through a notch 26a formed in the lower edge of a vertically aligned slide board 26, whose movement controls actuation of the release lever 25.

The slide board 26 is mounted by means (not shown) on a left-hand wall portion, not shown, of the main mount 2, and may slide forwards, or rearwards in a direction E with a conventional known construction thereof. The slide board 26 is normally held in a forwardmost position by a tension spring 27 suitably attached thereto and to a fixed portion of the housing 1. When in this forwardmost position, the slide board 26, acting through the release lever end 25b passing through the notch 26a, holds the release lever 25 in a position wherein the contact end 25a of the lever 25 does not contact the tab 23b of the film advance lever 23. When the slide board 26 is moved rearwards, which is effected by depression of the shutter button 12, the release lever end 25b also is moved rearwards by the board 26, and the release lever end 25a pushes the film advance lever 23 forwards, as described above. The shutter button 12 is in integral attachment to a lever arm 12b, which extends downwards, at right-angles, from one side of the rear edge thereof, the shutter button 12 and lever arm 12b thus constituting a right-angled lever, which is pivotally mounted on a fixed shaft 12a provided in the housing 1. The lower end of the lever arm 12b contacts a small projection 26b which extends sideways from the slide board 26. When the shutter button is depressed, in the direction indicated by the arrow D in the drawing, the lever arm 12b pushes the the slide board projection 26b, and causes the slide board 26 to move rearwards, in the direction E, and to actuate the release lever 25.

The shutter of the camera is constituted by, for example, a single-leaf shutter 28, which is pivotally mounted on a fixed pin provided in the housing 1, and is normally held in line with the optical axis CL of the lens 3 by a compression spring 29, which is attached at one end to a left-hand edge portion of the shutter 28, and at the other end to a fixed housing or mount portion leftward of the shutter 28. The lower end of the shutter 28 forms a generally triangular actuation portion 28a, the left-hand side of which is comparatively long, and is inclined at only a small angle to the horizontal. The shutter actuation portion 28a is contactable by an actuation arm 30, which is slightly flexible, is fixedly attached at one end to the upper surface of the actuation plate 17, and inclines upwards and leftwards at the other end. When the actuation plate 17 is moved from an uncocked to a cocked position; the actuation arm 30 is brought into contact with the left-hand side of the shutter actuation portion 28a, bends slightly, and is allowed to move past the shutter 28 without changing the position of the shutter 28. When the actuation plate 17 is moved from a cocked to an uncocked position, the arm 30 is brought into contact with the right-hand side of the shutter actuation portion 28a, and pivots the shutter 28 counter to the force of the spring 29, in the direction indicated by the arrow S, whereby the shutter 28 is moved out of line with the lens axis CL, and light passes through the lens 3 to expose a film frame. As the actuation plate 17 continues to move leftwards, the arm 30 is moved past the location of the lens 28, which is thereupon returned, by the spring 29, to its normal position in line with the lens optical axis CL.

Complete action in taking photographs with the abovementioned means is as follows. After a shot has been taken, or when the film 8 is initially loaded, the cocking plate 14, actuation plate 17 and film advance lever 23 carried thereon are in leftmost positions, and the film advance lever 23 engages the perforation 8a of the next film frame to be exposed, by actions of springs 16, 22 and 24. When the cocking plate 14 is moved manually in the direction A, the rod 15 pushes the actuation plate 17 also in the direction A, and the film advance lever 23 engaging the film perforation 8a causes the film 8 to be unwound from the loading chamber 6 and would into the windup chamber 7, and the next film frame to be brought into line with the exposure opening 4. After release of manual pressure on the cocking plate 14, the plate 14 is returned to a leftmost position by the action of the spring 16, as described earlier. The actuation plate 17, however, is still retained in a rightmost, cocked position, since the film advance lever 23 is still in engagement with the film perforation 8a, and is not free to move in the direction A or B independently of the actuation plate 17. When the shutter button 12 is depressed in the direction D, the slide board 26 is moved in the direction E, and causes the release lever 25 to pivot in the direction R and push the film advance lever 23 forwards and out of engagement with the perforation 8a, whereupon the actuation plate 17 is moved leftwards, to an uncocked position, by the spring 22, the shutter 28 being actuated by the arm 30 during this motion of the plate 17. When the actuation plate 17 reaches its uncocked position, the film advance lever 23 comes into engagement with the perforation 8a of the next film frame, and after release of pressure on the shutter button 12, the spring 27 pulls the cocking board 26 forwards to its normal position, whereby the shutter button 12 and release lever 25 also are returned to their original positions, in readiness for the next shot.

The film perforation coming after the last frame of the film 8 is in the form of an elongate perforation 8b, thus after the last film frame has been exposed, and the various elements of the camera have been returned to their normal, unactuated positions, the film advance lever 23 engages this elongate perforation 8b, and when, subsequently, the cocking plate 14 is moved in the direction A, the actuation plate 17 is moved to a cocked position, as before, and the film advance lever 23 presses again the right-hand edge of the elongate perforation 8b, and advances the film 8 a distance equal to one frame length. When, however, the cocking plate 14 is returned to an unactuated position by the spring 16, and rightward pressure on the actuation plate 17 is removed, the actuation plate 17 and film advance lever 23 are moved leftwards due to the action of the spring 22, until the engagement end 23a of the advance lever 23 comes against the left-hand edge of the perforation 8b. When the film advance lever 23 has thus been moved leftwards, the contact tab 23b thereof is in line with the above-mentioned recessed portion of the release lever 25. If, now, the release lever 25 is actuated by depression of the shutter button 12, the recessed portion 25c thereof moves towards the advance lever contact tab 23b, and the release lever 25 cannot move the advance lever 23 out of engagement with the elongate perforation 8b, and the actuation plate 17 cannot therefore be released to actuate the shutter 28, whereby the photographer is made aware that a complete roll of film 8 has been exposed.

As is clear from the above description, the present invention provides a simplified camera wherein film advance, shutter actuation, and detection of exposure of a last frame are effected by three basic elements, which are a shutter actuation plate, a film advance lever, and a release lever, constructional elements thus being reduced to a minimum, and cost correspondingly lowered.

Although the present invention has been fully described in conjunction with the preferred embodiment with reference to the accompanying drawings, it is to be noted that various changes and modifications are apparent to those skilled in the art. Accordingly, such changes and modifications should be construed as included within the spirit and scope of the present invention, unless otherwise they depart therefrom.

What is claimed is:

1. In a simplified camera comprising a lens system, shutter means for selectively preventing and permitting passage of light through said lens system, a moveable shutter button for actuation of said shutter means, a film loading chamber for reception of unexposed film, a film wind-up chamber for reception of exposed film, a film loaded therein, said chambers being provided on opposite sides of a rear portion of said photographic means, a film guide passageway connecting said chambers, an exposure frame formed in the front wall of said passageway, between said chambers, and a pressure means provided behind and in line with said exposure frame, and exerting forwards pressure on successive frames of a film passed through said passageway, an improvement thereof comprising a shutter actuation plate reciprocally slidable along a line parallel to film advance, means exerting a constant force to move said shutter actuation plate in a direction opposite to film advance and to an uncocked position, a film advance lever, means supporting said film advance lever on said shutter actuation plate for movement with said shutter actuation plate along a line parallel to film advance to a cocked or uncocked position and for slidable movement in a direction normal to film advance towards and away from said film for engaging successive perforations of said loaded film, baising means urging said film advance lever towards said loaded film, and a release lever operably connected with said shutter button, and operable upon actuation of said shutter button to disengage said film advance lever from a film perforation against said biasing means when said shutter actuation plate and said film advance lever are in cocked positions, said shutter actuation plate being movable to a cocked position and said film advance lever being carried therewith to advance said film one frame, means including said film advance lever engaging a perforation of said film for holding said shutter actuation plate in cocked position, whereby, when said shutter button is actuated, said release lever disengages said film advance lever from said perforation, and said shutter actuation plate returns to an uncocked position, and actuates said shutter means to expose a film frame.

2. A simplified camera as recited in claim 1, wherein the last perforation of said film is elongated, and said release lever comprises a pivotable member including a recessed portion, which is formed near the end of said release lever which contacts said film advance lever, and said recess is at least equal in length to the length of said last perforation, whereby, subsequently to said film advance lever engaging said last perforation, and advancing said film, upon being moved to a charged position by said shutter actuation plate, said shutter actuation plate and film advance lever are moved towards uncocked positions a distance approximately equal to the length of said last perforation, and said film advance lever is brought into line with said release lever recessed portion, whereupon, said film advance lever is not disengageable from said last perforation by said release lever, even upon actuation of said shutter button.

* * * * *